United States Patent
Schmidt et al.

(10) Patent No.: US 12,340,187 B2
(45) Date of Patent: Jun. 24, 2025

(54) SCOPE-BASED VISUAL-PROGRAMMING MECHANISM

(71) Applicant: Electronic Arts Inc., Redwood City, CA (US)

(72) Inventors: Kurtis Michael Schmidt, Port Moody (CA); Matthew Sean Halliday, Coquitlam (CA)

(73) Assignee: Electronic Arts Inc., Redwood City, CA (US)

( * ) Notice: Subject to any disclaimer, the term of this patent is extended or adjusted under 35 U.S.C. 154(b) by 0 days.

(21) Appl. No.: 17/031,247

(22) Filed: Sep. 24, 2020

(65) Prior Publication Data

US 2022/0091824 A1     Mar. 24, 2022

(51) Int. Cl.
*G06F 8/34*     (2018.01)

(52) U.S. Cl.
CPC ..................... *G06F 8/34* (2013.01)

(58) Field of Classification Search
CPC ..... G06F 8/34; G06F 8/38; G06F 8/36; G06F 8/33; G06F 9/451
See application file for complete search history.

(56) References Cited

U.S. PATENT DOCUMENTS

| | | | | |
|---|---|---|---|---|
| 8,230,515 B1 * | 7/2012 | Brewton | ................. | G06F 21/10 709/219 |
| 8,392,151 B1 * | 3/2013 | Grace | ..................... | G06T 19/00 703/22 |
| 9,430,194 B1 * | 8/2016 | Childs | ...................... | G06F 8/33 |
| 10,838,698 B2 * | 11/2020 | Lodhia | ...................... | G06F 8/36 |
| 10,860,295 B1 * | 12/2020 | Ketireddy | ................ | G06F 8/35 |
| 2010/0107115 A1 * | 4/2010 | Sareen | .................... | G06F 9/451 715/783 |
| 2017/0300303 A1 * | 10/2017 | Kodaganur | .............. | G06F 8/35 |
| 2019/0171425 A1 * | 6/2019 | Dempsey | ................. | G06F 8/36 |

OTHER PUBLICATIONS

"Introduction to Simulink", Hans-Petter Halvorsen, 2018 (Year: 2018).*
"Simulink Getting Started Guide", Mathworks, 2015 (Year: 2015).*
NPL3 (Mathworks, "For Iterator", Mar. 12, 2018) (Year: 2018).*

* cited by examiner

*Primary Examiner* — Noor Alkhateeb
(74) *Attorney, Agent, or Firm* — Lee & Hayes, P.C.

(57) ABSTRACT

A visual-programming tool provides an encapsulation mechanism configured to operate as a discrete section of a graph corresponding to a program in a visual-programming language. The encapsulation mechanism is configured to bind control flow of the visual-programming language to the encapsulation mechanism, determine logic associated with an encapsulated section of the graph, determine input and/or output associated with the encapsulated section, and present a visual representation of the encapsulation mechanism encompassing a visual representation of the input and/or output and logic in a graphical-user interface associated with the visual-programming tool. In some examples, the visual-programming tool can automatically position nodes associated with the encapsulation mechanism in the graphical-user interface.

20 Claims, 5 Drawing Sheets

SCOPE-BASED VISUAL-PROGRAMMING MECHANISM

BACKGROUND

In traditional visual programming languages, it can be difficult for developers to author loops and handle breaks without resorting to the visual equivalent of a "go to" command, which results in increased complexity and control flow lines going backward in conventional visual-programming spaces. Conventionally, code starts at an entry point, runs through a branch to another node or one of multiple possible nodes, and then proceeds on to yet another node based on the branch chosen. In conventional visual-programming languages, the developer manually connects each branch to the next node, creating a lot of visual noise as well as a number of maintenance problems when the code gets changed.

Previous solutions related to looping, branching, or similar discrete constructs have been limited because they require developers to shift the focus to the loop, branch, or similar discrete construct for analysis or editing, which obscures the rest of the program. Existing solutions open the construct in a separate graph editor, and developers cannot connect nodes across the different editors. Thus, developers manually add inputs and outputs and shift between editors to connect the construct. Shifting between different editors for the discrete construct and the overall program slows programming and defeats many benefits of the visualization. In addition, where a node exists in the original graph is often not visible to the developer while working in the construct editor, which further frustrates the purpose of the visualization. Moreover, it can be daunting for a new developer who is trying to learn what a colleague has built because they must drill into each construct, which obscures the rest of the program.

BRIEF DESCRIPTION OF THE DRAWINGS

This detailed description of a scope-based visual-programing mechanism is presented with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
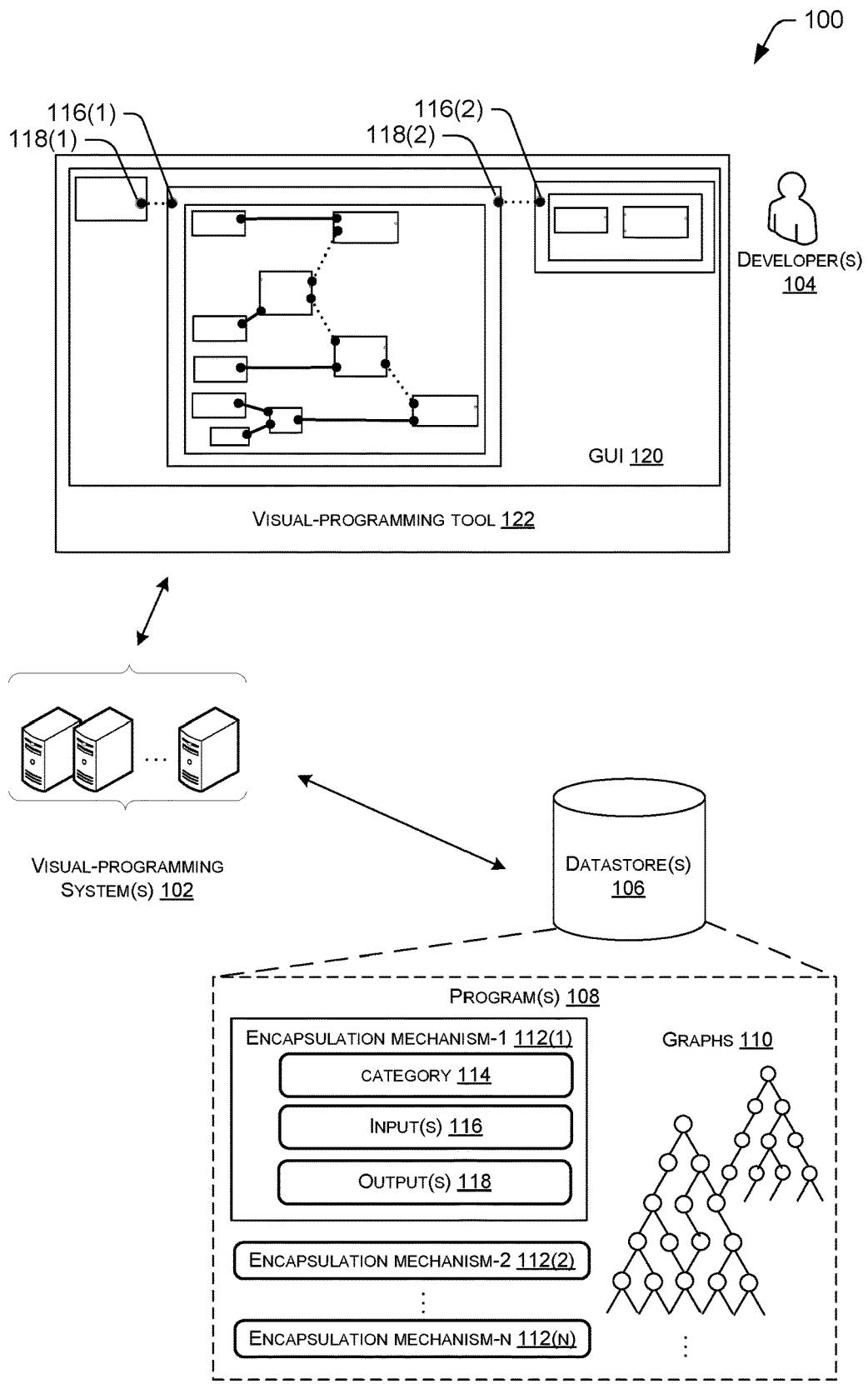
FIG. 1 illustrates an example operating environment for a scope-based visual-programming mechanism in accordance with examples described herein.

Examples in this disclosure describe techniques, e.g., methods, apparatuses, computer-readable media, and/or systems, for a scope-based visual-programming mechanism. Such a scope-based visual-programming mechanism can be used for visual programming of video games as well as other programming. For example, the visual-programming system described herein can improve programming speed for any program code including games in development, whether the programs in development are brand new programs, updates to existing programs, or new versions of existing programs. Developers, e.g., video game designers and other programmers, can use a scope-based visual-programming mechanism associated with visual-programming tools as described herein to expedite program development and to reduce time spent debugging compared to traditional textual programming or current visual-programming tools. In addition to reducing the time spent on initial program development and coding, reducing time spent identifying errors in program code can help shorten a time-consuming task for designers and testers. Correcting such errors is not only necessary for execution of the code but is also necessary to have the code cause a computing and/or gaming system to perform as desired during program execution including game play. Use of conventional visual-programming tools has become widespread in part because they can help eliminate simple errors that typically occur in textual programming like misspelled identifiers and operators and/or value/type mismatching. Conventional visual-programming tools can also help avoid errors in programming logic, but to date their usefulness related to looping, branching, or similar discrete constructs has been limited because they have made such constructs opaque and required developers to shift the focus to such a construct for analysis or editing, which in turn obscures the rest of the program. Moving between the discrete construct and the overall program slows programming. Reducing the time it takes developers to produce code with less errors is therefore desirable.

The scope-based visual-programming mechanism described herein is also called an encapsulation mechanism because it can encapsulate control flow logic, which allows developers to implicitly define control flow for looping, branching, and similar discrete constructs in an intuitive visual-programming graphical-user interface. The scope-based visual-programming mechanism can bind control flow of the visual-programming language to an encapsulation mechanism. An encapsulation mechanism is a programming construct that can guarantee control flow execution will return at the end of the internal update structure of the encapsulation mechanism. In other words, the encapsulation mechanism enables a developer to merely indicate that control enters the encapsulation mechanism without concern for intricacies of the loop, scope, or other discrete operation to be performed within the encapsulation mechanism. An encapsulation mechanism can also define data flow in and out of the encapsulation mechanism. The encapsulation mechanism enables a developer to simply connect the encapsulation mechanism to the next block without separately connecting operations to be performed within the encapsulation mechanism. The developer can add or edit nodes within the encapsulation mechanism but need not explicitly connect any internal nodes to nodes outside the encapsulation mechanism. Control flow being bound to the encapsulation mechanism can help avoid bugs and errors such as those often introduced by neglecting to connect an added branch to a node where control should continue or by neglecting to connect a node added in a loop to a node outside of the loop, for example.

An encapsulation mechanism can also create a new state such as a yield, which can help visual cleanliness in the workflow. For example, a developer can use an encapsulation mechanism to receive input associated with a certain number of game-play entities, e.g., characters, and return those with a health score above (or below) a certain threshold. The encapsulation mechanism can reduce the number of connections and reduce complexity from multiple branches writing to different values. In some examples, encapsulation mechanisms can be nested such as nested loops. In other words, encapsulation mechanisms can exist within encapsulation mechanisms. In some examples, encapsulation mechanisms can enable or cause automatic layout in a graphical-user interface associated with the visual-programming tool. In various examples, a developer can select a discrete section of an existing graph to encompass that portion of the graph in an encapsulation mechanism.

The scope-based visual-programming mechanism described herein can capture inputs for each operation included in an encapsulation mechanism and automatically pass the input through to the operation. For example, connecting an output from a node outside an encapsulation mechanism to an encapsulation mechanism and/or to a node within encapsulation mechanism can cause corresponding nodes to be automatically generated within the encapsulation mechanisms. These automatically generated nodes can represent the input being cascaded to the encapsulation mechanism and/or the nodes within the encapsulation mechanism. As another example, connecting an output from an outermost encapsulation mechanism to an innermost encapsulation mechanism can cause corresponding nodes to be generated within the encapsulation mechanisms. These automatically generated nodes can represent the input being cascaded to the innermost encapsulation mechanism.

In at least one example, encapsulation mechanisms can automatically create input and/or output and can automate control flow associated with common developer tasks. In other words, automatically as used herein means that receiving a selection or connecting a node triggers generation of an input and/or an output without further human interaction. In various examples, encapsulation mechanisms can automate intermediate steps so that developers do not have to program each one. For example, before the operations of binding control flow of a visual-programming language to an encapsulation mechanism as described herein, developers would create an input node, connect to the input node, create an output node, connect to the output node, connect the output of each node to the input of another node, etc. Binding control flow of a visual-programming language to encapsulation mechanisms as described herein can save developers several steps by allowing them to drag connections between encapsulation mechanisms, which can automatically cascade appropriate inputs and outputs for nodes encapsulated therein without requiring the developer to manually create each one. For example, using scope-based visual programming as described herein, a developer can connect the output of a node to a node within an encapsulation mechanism, and the encapsulation mechanism can automatically cascade the value through to the encapsulated node without requiring that the developer add and connect inputs and outputs for any intermediate structures. The encapsulation mechanism making corresponding input ports, output ports, and connections implicit can improve readability by keeping the code visible in the editor while omitting individual connections.

In some examples, encapsulation mechanisms can be used as function delegates, which can be passed to another language. Binding control flow of a visual-programming language to encapsulation mechanisms as described herein can leverage the work-flow optimization of scope-based visual-programming mechanisms outside of the visual-programming tool described herein. Thus, the scope-based visual-programming mechanism can serve as an encapsulation mechanism that can guarantee control flow execution will return to the end point.

In various examples, a visual-programming tool implementing a scope-based visual-programming mechanism can improve readability by automatically positioning nodes within encapsulation mechanisms and the encapsulation mechanisms themselves. For example, nodes can be arranged automatically to avoid control flow lines and/or input/output value lines intersecting. Avoiding the intersections can help make the flow easier to follow.

FIG. 1 illustrates an example operating environment for scope-based visual-programming mechanisms in accordance with examples described herein.

The example environment 100 includes one or more visual-programming system(s) 102 that can be used by one or more programmers/developer(s) 104 to create program code. Examples include games and/or other programs in development, whether the games and/or other programs in development are brand new games and/or other programs, updates to existing games, and/or new versions of existing games and/or other programs. Visual-programming system(s) 102 has one or more associated datastore(s) 106. The datastore(s) 106 store datasets that programmers/developers 104 can access to develop and/or improve video games and/or other programs using a graph-based visual-programming tool that can provide an interface for an encapsulation mechanism to encapsulate information in graph-based programming languages associated with the visual-programming system(s) 102.

According to some examples, datastore(s) 106 can store a variety of programs 108 including games or other programs, which can be represented as graphs 110. These graphs 110 can visually correspond to backend code. Various types of graphs can by represented by graphs 110 including those known from graph theory such as finite and infinite graphs, and/or directed graphs, etc. By binding control flow of a visual-programming language to encapsulation mechanisms as described herein properties of the types of graphs can be employed by the mechanism described herein to propagate and resolve information in graph-based programming languages, which can improve programmer/developer workflow compared to previous solutions. The illustrated example program 108 includes encapsulation mechanism-1 112(1). As shown, encapsulation mechanism-1 112(1) includes a variety of associated attributes such as category 114, input(s) 116, and output(s) 118, though these are but a few examples. A category 114 can represent any encapsulation mechanisms that can perform similar operations, functions, or processes, but may accept different input/output combinations, and/or have different types for inputs and/or outputs. As examples, a loop category can correspond to a variety of looping operations such as a for loop, a for-each loop, a while loop, etc., a scope category can correspond to a variety of scoping operations such as yield, branch, if/then, etc., and a lambda category can correspond to a variety of delegation operations, selected discrete graph sections, etc.

In the illustrated example, encapsulation mechanism-1 112(1) can correspond to a discrete section from one or more of the graphs 110. Although their details are omitted for brevity, any number of games or other programs can be included in program(s) 108 including encapsulation mechanism-2 112(2) through encapsulation mechanism-n 112(*n*), which can each have associated attributes like those shown for encapsulation mechanism-1 112(1).

Programmers/developers 104 can use encapsulation mechanism(s) 112 via a graphical-user interface 120 associated with a visual-programming tool 122 to optimize development workflow. The graphical-user interface 120 can graphically present details of encapsulation mechanism(s) 112 in the same editor as other parts of a graph 110 under development. Details of encapsulation mechanism(s) 112 can include inputs cascaded through the encapsulation mechanism(s) 112, whether initially connected to the encapsulation mechanism and/or to a node within the encapsulation mechanism and control flow through loops, branching, or other encapsulation mechanisms, which can vastly simplify the workflow of visual programming. Encapsulation mechanisms can also define control flow and/or data flow in and/or out of the encapsulation mechanism.

Figure 2:
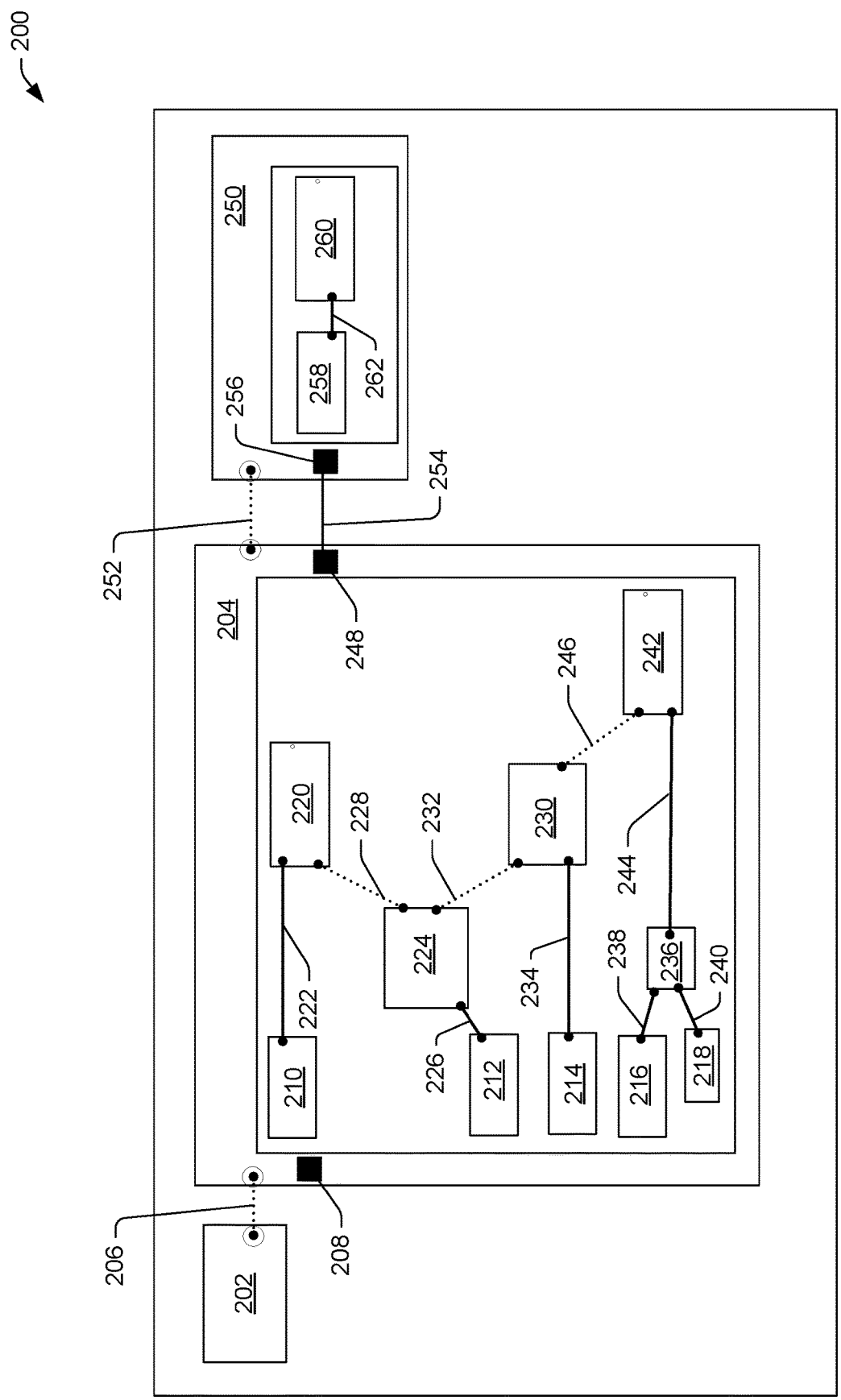
FIG. 2 illustrates an example graphical-user interface of a scope-based visual-programming mechanism as described herein.

FIG. 2 illustrates an example graphical-user interface 200, which represents an example of graphical-user interface 120 introduced in FIG. 1 and associated with a graph-based visual-programming tool 122 incorporating an encapsulation mechanism 112 to implement scope-based visual-programming as described herein.

In the illustrated example, blocks correspond to some nodes in a graph, such as from graph(s) 110. Of course, the examples shown are for explanation purposes and the usage of the disclosed systems and methods on other functions, operations, programs and so on is contemplated and within the scope of this disclosure.

In the illustrated example, element 202 represents an entry point to start a first encapsulation mechanism 112, which is represented by element 204. The dashed line 206 represents control flow. Element 208 represents data that will be available to functions located inside encapsulation mechanism 204. Element 208 can represent data received via an input, such as input(s) 116. In various examples, element 208 can represent data input received from another encapsulation mechanism and/or received via an input device.

For example, data represented by element 208 that the encapsulation mechanism represented by element 204 receives can include a first float property input represented by element 210, a first bool property input represented by element 212, a second bool property input represented by element 214, and a second float property input represented by element 216. A float represented by element 218 represents a float value to be received during execution of the code associated with the encapsulation mechanism represented by element 204. The encapsulation mechanism represented by element 204 passes a value associated with the first float property input represented by element 210 as an input to a first float property output represented by element 220. The solid line 222 represents the value being passed. The encapsulation mechanism represented by element 204 passes a value associated with the first bool property input represented by element 212 as an input condition to a branching operation represented by element 224. The solid line 226 represents the value being passed. When the result of the branching operation represented by element 224 is true, control flows as input to the first float property output represented by element 220. The dashed line 228 represents the control flow. When the result of the branching operation represented by element 224 is false, control flows as input to a branching operation represented by element 230. The dashed line 232 represents the control flow. The encapsulation mechanism represented by element 204 passes a value associated with the second bool property input represented by element 214 as an input condition to a branching operation represented by element 230. The solid line 234 represents the value being passed. The encapsulation mechanism represented by element 204 passes a value associated with the float property input represented by element 216 as an input to an add operation represented by element 236. The solid line 238 represents the value being passed. The encapsulation mechanism represented by element 204 passes a value associated with the float value 218 as an input to the add operation represented by element 236. The solid line 240 represents the value being passed.

The encapsulation mechanism represented by element 204 passes a result of the add operation represented by element 236 as an input to the second float property output represented by element 242. The solid line 244 represents the value being passed. When the result of the branching operation represented by element 230 is false, that bool value can identify a condition that maintains output from the encapsulation mechanism represented by element 204. The dashed line 246 represents the control flow from element 230 to 242. Element 248 represents data that is produced by the encapsulation mechanism 204. In various examples, element 248 can represent data made available via an output, such as output(s) 118. When the result of the branching operation represented by element 230 is true, element 242 will run, which could modify the value to be returned by element 248. As an example, data 208 can include that a variable, "a" has a value, e.g., a=10 and a variable "b" may also have a value as input to encapsulation mechanism 204; the operation represented by element 230 can identify a condition, e.g., if b>50. When the result of the branching operation represented by element 230 is true (e.g., b>50), as represented by the dashed line 246, control flows as input to the second float property output represented by element 242, where the value of a is changed, e.g., a=100. When the result of the branching operation represented by element 230 is false (e.g., b!=50), control the value of a is not changed, e.g., a=10.

In operation, processing associated with an encapsulation mechanism runs until a predetermined condition is met. The predetermined condition can differ depending on the category (e.g., category as represented by element 114) and/or specific type of the encapsulation mechanism. A few examples include: Simple Scope, which runs the logic of the encapsulation mechanism once, then returns. While Loop, which runs repeatedly until a defined condition is met. For Each Loop, which runs the logic of the encapsulation mechanism once for elements in an input array value. For Loop, which runs N times based on a received value for N; N can be received in a multitude of ways, e.g., received from a user input, from another encapsulation mechanism, etc. Many more examples exist.

In the illustrated example, a second encapsulation mechanism 112 is represented by element 250. The dashed line 252 represents control flow coming from the first encapsulation mechanism represented by element 204 and being received by the second encapsulation mechanism represented by element 250. The encapsulation mechanism represented by element 250 receives the values output from the first encapsulation mechanism represented by element 204, though not all need be used by the second encapsulation mechanism represented by element the second encapsulation mechanism represented by element 250. The solid line 254 represents this data flow from element 248 to element 256. Element 256 represents data that will be available to functions located inside the second encapsulation mechanism represented by element 250, though not all need be used by the second encapsulation mechanism represented by element 250. The values received by the second encapsulation mechanism represented by element 250 include a third bool property input represented by element 258. The second encapsulation mechanism represented by element 250 passes a value associated with the third bool property input represented by element 258 as an input value to a bool property output represented by element 260. The solid line 262 represents the value being passed. The first encapsulation mechanism represented by element 204 and the second encapsulation mechanism represented by element 250 are visible and available for manipulation in the graphical-user interface 200 without requiring developers to double click or otherwise drill into either of them. In this way, the encapsulation mechanisms represented by elements 204 and 250 are transparent on the development canvas in contrast to the opaque solutions previously employed. This transparency can be helpful for developers because it does not obscure the context of the program like earlier solutions. Encapsulation mechanisms 112 allow developers to connect as they go with the encapsulation mechanisms 112 optimizing the workflow compared to setting up individual inputs.

Encapsulation mechanisms 112 can allow developers to intuitively make connections from outside an encapsulation mechanism to nodes inside the encapsulation mechanism, and the encapsulation mechanism can implicitly capture the input and/or control flow associated with the connection and provide the input to the appropriate node during execution. Moreover, a new developer on a project can view what a colleague has built in the context of the rest of the program without drilling into each construct.

Figure 3:
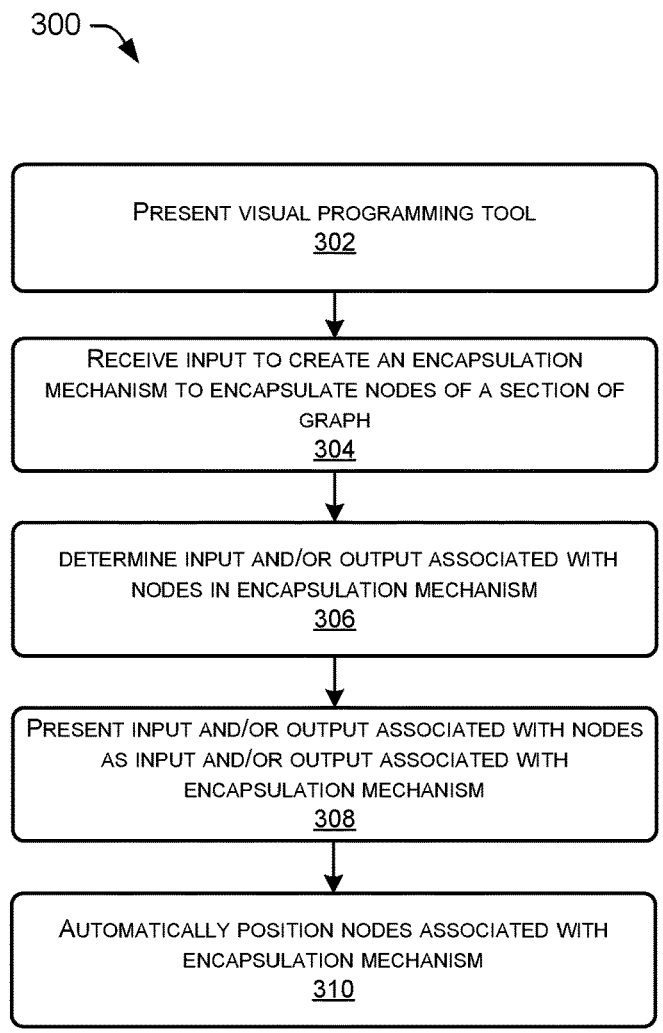
FIG. 3 illustrates a flow diagram of an example method associated with a scope-based visual-programming mechanism as described herein.

FIG. 3 illustrates a flow diagram of an example method 300 associated with a scope-based visual-programming mechanism as described herein. Method 300 can include operation of a visual-programming tool 122 that is associated with a graphical-user interface 120 and an input interface associated with visual-programming system 102. The visual-programming tool 122 can be used by a plurality of developers 104.

At block 302, visual-programming system 102 can provide a visual-programming tool 122 associated with a graphical-user interface such as graphical-user interface 120. The visual-programming tool 122 can enable a developer to program in a graph-based programming language. The visual-programming tool 122 can bind control flow associated with the visual programming language to an encapsulation mechanism that can ensure that control flow execution will return at the end of the internal update structure of the encapsulation mechanism.

At block 304, in some examples, an input interface associated with a visual-programming tool 122 associated with visual-programming system 102 can receive an input to create an encapsulation mechanism to encapsulate one or more nodes selected from a section of an existing graph for conversion to an instance of the encapsulation mechanism. In some examples, an input interface associated with a visual-programming tool 122 associated with visual-programming system 102 can receive an input to create an encapsulation mechanism to which one or more nodes corresponding to a section of a graph can be added.

At block 306, a scope-based visual-programming mechanism associated with visual-programming system 102 can determine input and/or output associated with nodes within the encapsulation mechanism.

At block 308, a scope-based visual-programming mechanism associated with visual-programming system 102 can present input and/or output associated with nodes within the encapsulation mechanism as input and/or output associated with the encapsulation mechanism.

At block 310, in some examples, a scope-based visual-programming mechanism associated with visual-programming system 102 can automatically position nodes associated with the encapsulation mechanism in the graphical-user interface 120. For example, the scope-based visual-programming mechanism can automatically position nodes to minimize intersection between value and/or control flow lines. Additionally, the scope-based visual-programming mechanism can automatically position nodes to minimize intersection between value and/or control flow lines and the nodes.

Figure 4:
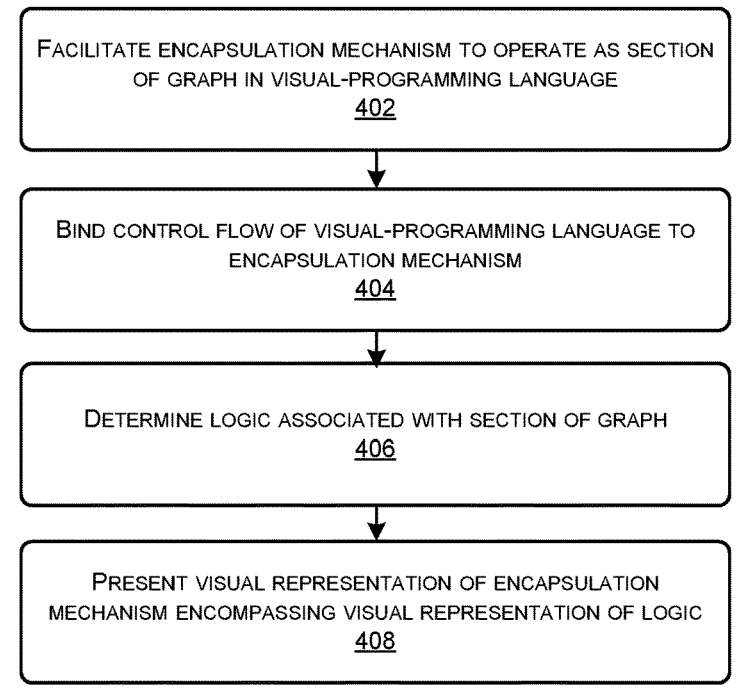
FIG. 4 illustrates a flow diagram of an example method associated with a scope-based visual-programming mechanism as described herein.

FIG. 4 illustrates a flow diagram of an example method 400 associated with a scope-based visual-programming mechanism as described herein. Method 400 represents operation of a visual-programming tool 122 that is associated with a graphical-user interface 120 and an input interface associated with visual-programming system 102. The visual-programming tool 122 can be used by a plurality of developers 104.

At block 402, visual-programming system 102 can enable an encapsulation mechanism to operate as a section of a graph in a graph-based visual-programming language associated with a visual-programming tool 122.

At block 404, visual-programming system 102 can bind control flow of the visual-programming language to the encapsulation mechanism such that control flow execution returning at the end of the internal update structure of the encapsulation mechanism is guaranteed.

At block 406, visual-programming system 102 can determine logic associated with a section of a graph in the graph-based visual-programming language.

At block 408, visual-programming system 102 can cause the visual-programming tool 122 to present a visual representation of an encapsulation mechanism encompassing a visual representation of the logic in the graphical-user interface 120.

Figure 5:
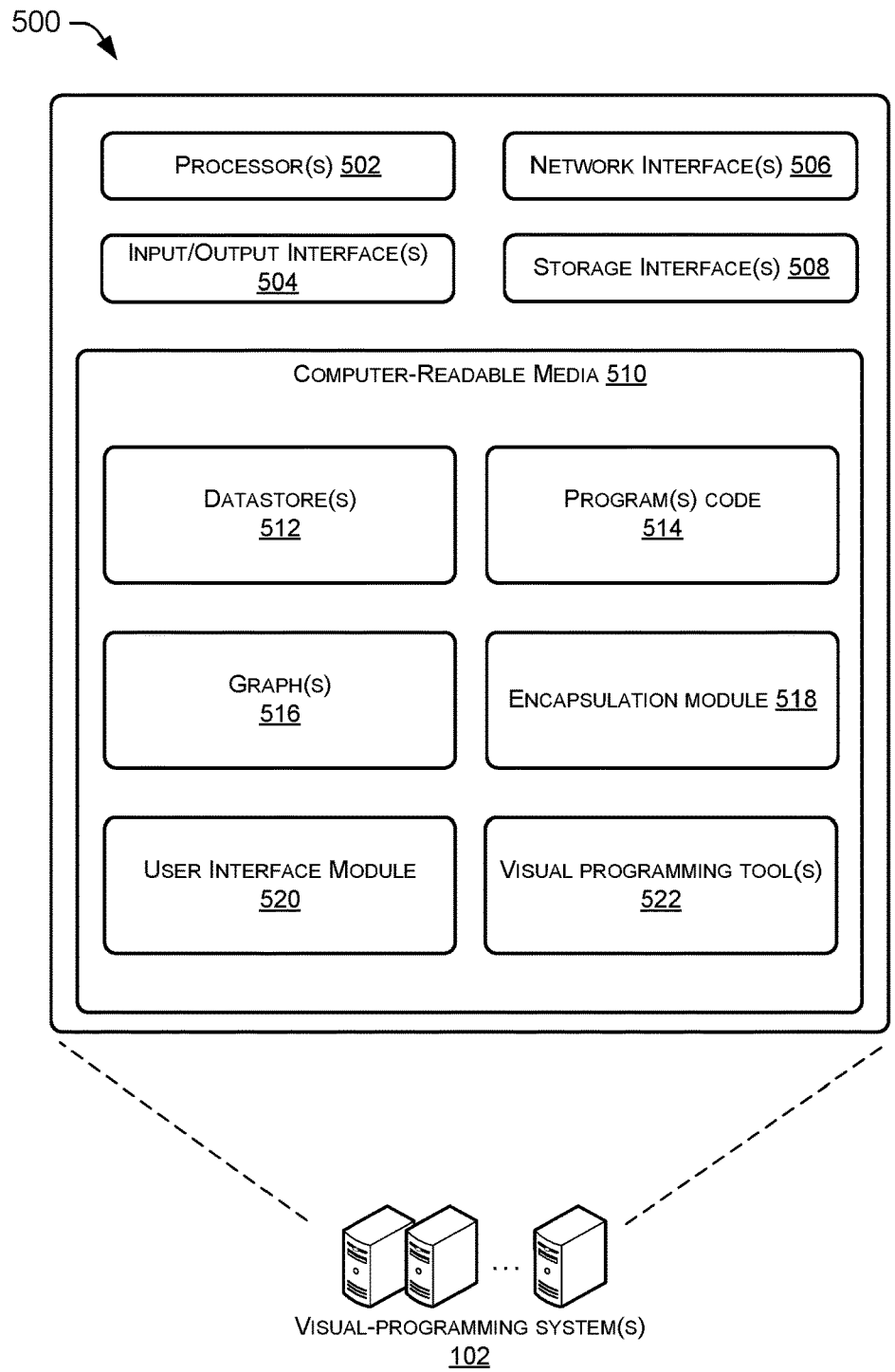
FIG. 5 illustrates a block diagram of an example visual-programming system that can implement a scope-based visual-programming mechanism, in accordance with examples described herein.

FIG. 5 illustrates a block diagram of example computing device(s) 500 of visual-programming system(s) 102 that can implement scope-based visual-programming mechanisms, in accordance with examples described herein.

The computing device(s) 500 can include one or more processor(s) 502, one or more input/output (I/O) interface(s) 504, one or more network interface(s) 506, one or more storage interface(s) 508, and computer-readable media 510.

In various examples, the processors(s) 502 can include one or more of a central processing unit (CPU), a graphics processing unit (GPU), a microprocessor, a digital signal processor, and/or other processing units or components. Alternatively, or in addition, the processing described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each processor(s) 502 can possess its own local memory, which also can store programs, program data, and/or one or more operating systems. Furthermore, the one or more processor(s) 502 can include one or more cores.

The one or more input/output (I/O) interface(s) 504 can enable the computing device(s) 500 of visual-programming system(s) 102 to detect interaction with a developer 104 and/or other computing system(s). The I/O interface(s) 504 can include a combination of hardware, software, and/or firmware and can include software drivers for enabling the operation of any variety of I/O device(s) integrated on the computing device(s) 500 of visual-programming system(s) 102 or with which computing device(s) 500 of visual-programming system(s) 102 interact, such as displays, microphones, mouse-input devices, pen-input devices, touch-input devices, keyboard-input devices, speakers, cameras, switches, and any other variety of sensors, or the like. In various examples, the I/O devices of the computing device(s) 500 of visual-programming system(s) 102 can include touch, audio, video, and/or other input/output functionality.

The network interface(s) 506 can enable the computing device(s) 500 of visual-programming system(s) 102 to communicate via the one or more network(s). The network interface(s) 506 can include a combination of hardware, software, and/or firmware and can include software drivers for enabling a variety of protocol-based communications, and a variety of wireline and/or wireless ports/antennas. For example, the network interface(s) 506 can include one or more of a cellular radio, a wireless (e.g., IEEE 802.1x-based) interface, a Bluetooth® interface, and the like. In some examples, the network interface(s) 506 can connect to the Internet. The network interface(s) 506 can further enable the computing device(s) 500 of visual-programming system(s) 102 to communicate over circuit-switch domains and/or packet-switch domains.

The storage interface(s) 508 can enable the processor(s) 502 to interface and exchange data with computer-readable media 510, as well as any storage device(s) external to the computing device(s) 500 of visual-programming system(s) 102, such as if datastore 106 is implemented in separate computing device(s) associated with visual-programming system(s) 102. The storage interface(s) 508 can further enable access to removable media.

The computer-readable media 510 can include volatile and/or nonvolatile memory, removable and non-removable media implemented in any method or technology for storage of information, such as computer-readable instructions, data structures, program functions, or other data. Such memory includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media 510 can be implemented as computer-readable storage media (CRSM), which may be any available physical media accessible by the processor(s) 502 to execute instructions stored on the computer-readable media 510. In one implementation, CRSM can include random access memory (RAM) and Flash memory. In some implementations, CRSM can include, but is not limited to, read-only memory (ROM), electrically erasable programmable read-only memory (EEPROM), or any other tangible medium which can be used to store the desired information, and which can be accessed by the processor(s) 502. The computer-readable media 510 can have an operating system (OS) and/or a variety of suitable applications stored thereon. The OS, when executed by the processor(s) 502 can enable management of hardware and/or software resources of the computing device(s) 500 of visual-programing system(s) 102.

Several functional blocks having instruction, data stores, and so forth can be stored within the computer-readable media 510 and configured to execute on the processor(s) 502. The computer-readable media 510 can have stored thereon a datastore(s) 512, which can correspond to datastore 106, program code(s) 514, which can correspond to program(s) 108, graph(s) 516, which can correspond to graphs 110, encapsulation module 518, which can enable encapsulation mechanisms 112, user-interface module 520, which can enable graphical-user interface 120, and associated visual-programming tool 122s 522. It will be appreciated that each of the blocks 512, 514, 516, 518, 520, and 522 can include instructions that when executed by the processor(s) 502 enable various functions pertaining to the operations of the computing device(s) 500 of visual-programming system(s) 102. It should further be noted that one or more of the functions associated with blocks 512, 514, 516, 518, 520, and 522 can operate separately or in conjunction with each other.

The instructions stored in datastore 512, when executed by processor(s) 502, can configure computing device(s) 500 of visual-programming system(s) 102 to allow scope-based visual-programming mechanisms, such as those associated with visual-programming tool 122 as described herein, to store and/or access data associated with existing program(s) such as metadata associated with the existing programs, performance metrics associated with the existing programs, etc.

The instructions stored in program(s) code 514, when executed by processor(s) 502, can configure computing device(s) 500 of visual-programming system(s) 102 to allow scope-based visual-programming mechanisms, such as those associated with visual-programming tool 122 to access existing program(s), which can be represented as graphs and attributes of associated program(s), (e.g., games), including node data, connection data, etc.

The instructions stored in graph(s) 516, when executed by processor(s) 502, can configure computing device(s) 500 of visual-programming system(s) 102 to allow scope-based visual-programming mechanisms, such as those associated with visual-programming tool 122, to traverse graphs according to attributes of associated program(s), (e.g., games), including node data, connection data, etc.

The instructions stored in encapsulation module 518, when executed by processor(s) 502, can configure computing device(s) 500 of visual-programming system(s) 102 to allow scope-based visual-programming mechanisms associated with visual-programming tool 122 to bind control flow of a visual-programming language to one or more encapsulation mechanisms 112 such that attributes of graph-based programs, including node data, connection data, etc. are guaranteed to be returned when update of graph section(s) encompassed by the encapsulation mechanism(s) is complete.

The instructions stored in user-interface module 520, when executed by processor(s) 502, can configure computing device(s) 500 of visual-programming system(s) 102 to provide a graphical-user interface 120, which can include one or more encapsulation mechanism(s) 112, for presentation in a visual programming environment.

The instructions stored in visual-programming tool(s) 522, corresponding to visual-programming tool 122, when executed by processor(s) 502, can configure computing device(s) 500 of visual-programming system(s) 102 to provide encapsulation mechanism(s) 112 for presentation in a graphical-user interface 120.

The illustrated aspects of the claimed subject matter can be practiced in distributed computing environments where certain tasks are performed by remote processing devices that are linked through a communications network. In a distributed computing environment, program functions can be located in both local and remote memory storage devices.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

The disclosure is described above with reference to block and flow diagrams of systems, methods, apparatuses, and/or computer program products according to examples of the disclosure. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams need not necessarily be performed in the order presented or need not necessarily be performed at all, according to some examples of the disclosure.

Computer-executable program instructions can be loaded onto a general purpose computer, a special-purpose computer, a processor, or other programmable data processing apparatus to produce a particular machine, such that the instructions that execute on the computer, processor, or other programmable data processing apparatus implement one or more functions specified in the flowchart block or blocks. These computer-program instructions can also be stored in a computer-readable memory that can direct a computer or other programmable data processing apparatus to function in a particular manner, such that the instructions stored in the computer-readable memory produce an article of manufacture including instruction that implement one or more functions specified in the flow diagram block or blocks. Examples of the disclosure provide for a computer program product, comprising a computer usable medium having a computer-readable program code or program instructions embodied therein, the computer-readable program code adapted to be executed to implement one or more functions specified in the flow diagram block or blocks. The computer-program instructions can also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

It will be appreciated that each of the memories and data storage devices described herein can store data and information for subsequent retrieval. The memories and databases can be in communication with each other and/or other databases, such as a centralized database, or other types of data storage devices. When needed, data or information stored in a memory or database can be transmitted to a centralized database capable of receiving data, information, or data records from more than one database or other data storage devices. In some embodiments, the databases shown can be integrated or distributed into any number of databases or other data storage devices.

Many modifications and other embodiments of the disclosure set forth herein will be apparent having the benefit of the teachings presented in the foregoing descriptions and the associated drawings. Therefore, it is to be understood that the disclosure is not to be limited to the specific examples disclosed and that modifications and other embodiments are intended to be included within the scope of the appended claims. Although specific terms are employed herein, they are used in a generic and descriptive sense only and not for purposes of limitation unless specifically defined herein.

What is claimed is:

1. A system comprising:
one or more processors;
one or more computer-readable media storing computer-executable instructions that, when executed by the one or more processors, cause the one or more processors to:
create a first encapsulation mechanism based on a first input and create a second encapsulation mechanism based on a second input, at least one of the first input or the second input based on receiving a selection of one or more existing nodes of a graph corresponding to a computer program in a visual-programming language for conversion to an instance of one or more of the first encapsulation mechanism or the second encapsulation mechanism;
enable the first encapsulation mechanism and the second encapsulation mechanism within a visual-programming tool, the first encapsulation mechanism including at least a loop in the first encapsulation mechanism within the visual-programming tool, the second encapsulation mechanism including at least one of a delegation operation or a scope, at least one of the first encapsulation mechanism or the second encapsulation mechanism configured to operate as a discrete section of the graph, the graph corresponding to the computer program under development in the visual-programming language;
bind first control flow, according to first logic associated with the visual-programming language in which the computer program is under development, to the first encapsulation mechanism;
bind second control flow, according to second logic associated with the visual-programming language in which the computer program is under development, to the second encapsulation mechanism; and
determine at least one of the first logic or the second logic associated with the discrete section of the graph, wherein at least one of the first encapsulation mechanism or the second encapsulation mechanism is configured to:
access a first variable outside the at least one of the first encapsulation mechanism or the second encapsulation mechanism as input to the first logic or the second logic;
write output of the at least one of the first logic or the second logic to a second variable outside the at least one of the first encapsulation mechanism or the second encapsulation mechanism without receiving an indication to directly connect the first variable and the second variable; and
present, in a graphical-user interface associated with the visual-programming tool, a first visual representation of the first encapsulation mechanism representing the first logic and a second visual representation of the second encapsulation mechanism representing the second logic, wherein at least one of the first visual representation or the second visual representation is at least partially transparent.

2. The system of claim 1, the one or more computer-readable media storing computer-executable instructions that, when executed by the one or more processors, configure the system to perform acts further comprising:
  executing the first logic to obtain a value local to the first encapsulation mechanism; and
  returning the first control flow outside the first encapsulation mechanism when the execution of the first logic completes.

3. The system of claim 1, the one or more computer-readable media storing computer-executable instructions that, when executed by the one or more processors, configure the system to perform acts further comprising automatically positioning:
  the at least one of the first encapsulation mechanism or the second encapsulation mechanism;
  a representation of nodes within the at least one of the first encapsulation mechanism or the second encapsulation mechanism; and
  a representation of nodes outside the at least one of the first encapsulation mechanism or the second encapsulation mechanism.

4. The system of claim 1, the one or more computer-readable media storing computer-executable instructions that, when executed by the one or more processors, configure the system to perform acts further comprising:
  receiving an input connecting a first node represented in the first visual representation of the first encapsulation mechanism to a second node in the second visual representation of the second encapsulation mechanism without receiving an indication to open another interface associated with the first encapsulation mechanism or the second encapsulation mechanism;
  automatically creating inputs to the second encapsulation mechanism and outputs from the second encapsulation mechanism based on receiving the input; and
  automatically, without human manipulation, connecting the first visual representation of the first encapsulation mechanism to the second visual representation of the second encapsulation mechanism based on the input.

5. The system of claim 1, the one or more computer-readable media storing computer-executable instructions that, when executed by the one or more processors, configure the system to perform acts further comprising:
  automatically positioning:
    the second visual representation of the second encapsulation mechanism;
    a visual representation of a first node within the first encapsulation mechanism;
    a visual representation of a second node within the second encapsulation mechanism; and
    a visual representation of a third node outside at least one of the first visual representation of the first encapsulation mechanism or the second visual representation of the second encapsulation mechanism.

6. The system of claim 1,
  the one or more computer-readable media further storing computer-executable instructions that, when executed by the one or more processors, cause the one or more processors to:
  connect an output from the first encapsulation mechanism as an outer encapsulation mechanism to the second encapsulation mechanism as an inner encapsulation mechanism; and
  cause corresponding nodes to be generated within the first encapsulation mechanism and the second encapsulation mechanism.

7. The system of claim 5, the one or more computer-readable media storing computer-executable instructions that, when executed by the one or more processors, configure the system to perform acts further comprising automatically, without receiving an indication of human manipulation, positioning at least a representation of the second node within the second encapsulation mechanism.

8. The system of claim 1, the one or more computer-readable media storing computer-executable instructions that, when executed by the one or more processors, configure the system to perform acts further comprising:
  presenting, in the graphical-user interface associated with the visual-programming tool, a visual representation of the second encapsulation mechanism and a representation of a node; and
  automatically, without receiving an indication of human manipulation, positioning the representation of the node outside at least one of the visual representation of the first encapsulation mechanism or the visual representation of the second encapsulation mechanism.

9. One or more non-transitory computer-readable media storing computer-executable instructions that, when executed by one or more processors, cause the one or more processors to perform acts comprising:
  creating a first encapsulation mechanism based on a first input and create a second encapsulation mechanism based on a second input, at least one of the first input or the second input based on receiving a selection of one or more existing nodes of a graph corresponding to a computer program in a visual-programming language for conversion to an instance of one or more of the first encapsulation mechanism or the second encapsulation mechanism;
  enabling the first encapsulation mechanism and the second encapsulation mechanism within a visual-programming tool, the first encapsulation mechanism including at least a loop in the first encapsulation mechanism within the visual-programming tool, the second encapsulation mechanism including at least one of a delegation operation or a scope, at least one of the first encapsulation mechanism or the second encapsulation mechanism configured to operate as a discrete section of the graph, the graph corresponding to the computer program under development in the visual-programming language;
  binding first control flow, according to first logic associated with the visual-programming language in which the computer program is under development, to the first encapsulation mechanism;
  binding second control flow, according to second logic associated with the visual-programming language in which the computer program is under development, to the second encapsulation mechanism; and
  determining at least one of the first logic or the second logic associated with the discrete section of the graph, wherein at least one of the first encapsulation mechanism or the second encapsulation mechanism is configured to:
    access a first variable outside the at least one of the first encapsulation mechanism or the second encapsulation mechanism as input to the first logic or the second logic;
    write output of the at least one of the first logic or the second logic to a second variable outside the at least one of the first encapsulation mechanism or the second encapsulation mechanism without receiving an indication to directly connect the first variable and the second variable; and present, in a graphical-user interface associated with the visual-programming tool, a first visual representation of the first encapsulation mechanism representing the first logic and a second visual representation of the second encapsulation mechanism representing the second logic, wherein at least one of the first visual representation or the second visual representation is at least partially transparent.

10. The one or more non-transitory computer-readable media of claim 9, the acts further comprising:
executing the first logic to obtain a value local to the first encapsulation mechanism; and
returning the first control flow outside the first encapsulation mechanism when the execution of the first logic completes.

11. The one or more non-transitory computer-readable media of claim 9, the acts further comprising automatically positioning:
the at least one of the first encapsulation mechanism or the second encapsulation mechanism;
a representation of nodes within the at least one of the first encapsulation mechanism or the second encapsulation mechanism; and
a representation of nodes outside the at least one of the first encapsulation mechanism or the second encapsulation mechanism.

12. The one or more non-transitory computer-readable media of claim 9, the acts further comprising:
receiving an input connecting a first node represented in the first visual representation of the first encapsulation mechanism to a second node in the second visual representation of the second encapsulation mechanism without receiving an indication to open another interface associated with the first encapsulation mechanism or the second encapsulation mechanism;
automatically creating inputs to the second encapsulation mechanism and outputs from the second encapsulation mechanism based on receiving the input; and
automatically, without human manipulation, connecting the first visual representation of the first encapsulation mechanism to the second visual representation of the second encapsulation mechanism based on the input.

13. The one or more non-transitory computer-readable media of claim 9, the acts further comprising:
automatically positioning:
the second visual representation of the second encapsulation mechanism;
a visual representation of a first node within the first encapsulation mechanism;
a visual representation of a second node within the second encapsulation mechanism; and
a visual representation of a third node outside at least one of the first visual representation of the first encapsulation mechanism or the second visual representation of the second encapsulation mechanism.

14. The one or more non-transitory computer-readable media of claim 9, the acts further comprising:
connecting an output from the first encapsulation mechanism as an outer encapsulation mechanism to the second encapsulation mechanism as an inner encapsulation mechanism; and
causing corresponding nodes to be generated within the first encapsulation mechanism and the second encapsulation mechanism.

15. The one or more non-transitory computer-readable media of claim 9, the acts further comprising:
presenting, in the graphical-user interface associated with the visual-programming tool, a visual representation of the second encapsulation mechanism and a representation of a node; and
automatically, without receiving an indication of human manipulation, positioning the representation of the node outside at least one of the visual representation of the first encapsulation mechanism or the visual representation of the second encapsulation mechanism.

16. A method comprising:
creating a first encapsulation mechanism based on a first input and create a second encapsulation mechanism based on a second input, at least one of the first input or the second input based on receiving a selection of one or more existing nodes of a graph corresponding to a computer program in a visual-programming language for conversion to an instance of one or more of the first encapsulation mechanism or the second encapsulation mechanism;
enabling the first encapsulation mechanism and the second encapsulation mechanism within a visual-programming tool, the first encapsulation mechanism including at least a loop in the first encapsulation mechanism within the visual-programming tool, the second encapsulation mechanism including at least one of a delegation operation or a scope, at least one of the first encapsulation mechanism or the second encapsulation mechanism configured to operate as a discrete section of the graph, the graph corresponding to the computer program under development in the visual-programming language;
binding first control flow, according to first logic associated with the visual-programming language in which the computer program is under development, to the first encapsulation mechanism;
binding second control flow, according to second logic associated with the visual-programming language in which the computer program is under development, to the second encapsulation mechanism; and
determining at least one of the first logic or the second logic associated with the discrete section of the graph, wherein at least one of the first encapsulation mechanism or the second encapsulation mechanism is configured to:
access a first variable outside the at least one of the first encapsulation mechanism or the second encapsulation mechanism as input to the first logic or the second logic;
write output of the at least one of the first logic or the second logic to a second variable outside the at least one of the first encapsulation mechanism or the second encapsulation mechanism without receiving an indication to directly connect the first variable and the second variable; and
present, in a graphical-user interface associated with the visual-programming tool, a first visual representation of the first encapsulation mechanism representing the first logic and a second visual representation of the second encapsulation mechanism representing the second logic, wherein at least one of the first visual representation or the second visual representation is at least partially transparent.

17. The method of claim 16, further comprising:
executing the first logic to obtain a value local to the first encapsulation mechanism; and returning the first control flow outside the first encapsulation mechanism when the execution of the first logic completes.

18. The method of claim 16, further comprising automatically positioning:
   the at least one of the first encapsulation mechanism or the second encapsulation mechanism;
   a representation of nodes within the at least one of the first encapsulation mechanism or the second encapsulation mechanism; and
   a representation of nodes outside the at least one of the first encapsulation mechanism or the second encapsulation mechanism.

19. The method of claim 16, further comprising:
   receiving an input connecting a first node represented in the first visual representation of the first encapsulation mechanism to a second node in the second visual representation of the second encapsulation mechanism without receiving an indication to open another interface associated with the first encapsulation mechanism or the second encapsulation mechanism;
   automatically creating inputs to the second encapsulation mechanism and outputs from the second encapsulation mechanism based on receiving the input; and
   automatically, without human manipulation, connecting the first visual representation of the first encapsulation mechanism to the second visual representation of the second encapsulation mechanism based on the input.

20. The method of claim 16, further comprising:
automatically positioning:
the second visual representation of the second encapsulation mechanism;
a visual representation of a first node within the first encapsulation mechanism;
a visual representation of a second node within the second encapsulation mechanism; and
a visual representation of a third node outside at least one of the first visual representation of the first encapsulation mechanism or the second visual representation of the second encapsulation mechanism.

* * * * *